US009087217B2

(12) United States Patent
Gallois et al.

(10) Patent No.: US 9,087,217 B2
(45) Date of Patent: Jul. 21, 2015

(54) METHOD FOR ENHANCING DATA RELIABILITY IN A COMPUTER

(71) Applicants: Xavier Gallois, Chaponnay (FR); Guillaume Vibert, Caluire et Cuire (FR)

(72) Inventors: Xavier Gallois, Chaponnay (FR); Guillaume Vibert, Caluire et Cuire (FR)

(73) Assignee: ALSTOM TRANSPORT TECHNOLOGIES, Levallois-Perret (FR)

( * ) Notice: Subject to any disclaimer, the term of this patent is extended or adjusted under 35 U.S.C. 154(b) by 63 days.

(21) Appl. No.: 13/921,766

(22) Filed: Jun. 19, 2013

(65) Prior Publication Data

US 2013/0339755 A1 Dec. 19, 2013

(30) Foreign Application Priority Data

Jun. 19, 2012 (FR) ...................................... 12 55728

(51) Int. Cl.
*G06F 11/30* (2006.01)
*G06F 7/04* (2006.01)
(Continued)

(52) U.S. Cl.
CPC ................. *G06F 21/64* (2013.01); *B61L 19/06* (2013.01); *B61L 27/0061* (2013.01); *G05B 9/03* (2013.01);
(Continued)

(58) Field of Classification Search
CPC . G06F 21/64; G06F 11/0796; G06F 11/1633; G06F 21/554; B61L 19/06
USPC .................. 726/24, 25, 26, 1, 21, 27; 713/190
See application file for complete search history.

(56) References Cited

U.S. PATENT DOCUMENTS

5,757,915 A * 5/1998 Aucsmith et al. ............. 713/187
6,910,128 B1 * 6/2005 Skibbie et al. ................ 713/170
(Continued)

*Primary Examiner* — Abu Sholeman
(74) *Attorney, Agent, or Firm* — Davidson, Davidson & Kappel, LLC (57) ABSTRACT

A method for enhancing reliability of data is provided. A computer configured to provide output datum (Ds) from input datum (De), includes at least two data processing modules, and a computing member connected to each module. The method includes computing, with each module, intermediate datum ($D_{IA}$, $D_{IB}$) from the input datum (De) calculating, with each module, an intermediate security code ($C_{SIA}$, $C_{SIB}$) from the corresponding intermediate datum ($D_{IA}$, $D_{IB}$), transmitting to the computing member with each module, the intermediate security code ($C_{SIA}$, $C_{SIB}$) and the intermediate datum ($D_{IA}$, $D_{IB}$), computing, a security code ($C_S$) from the intermediate security codes ($C_{SIA}$, $C_{SIB}$), selecting, an intermediate datum from among the received intermediate data ($D_{IA}$, $D_{IB}$) the output datum, (Ds) of the computer including the selected intermediate datum, and transmitting to a receiving device, the security code ($C_S$) and output datum (Ds). A computer, communication unit, a railway management system and computer readable media are also provided.

13 Claims, 3 Drawing Sheets

(51) Int. Cl.
*G06F 21/64* (2013.01)
*B61L 19/06* (2006.01)
*G05B 9/03* (2006.01)
*G06F 21/55* (2013.01)
*B61L 27/00* (2006.01)
*G06F 11/07* (2006.01)
*G06F 11/16* (2006.01)
*B61L 21/04* (2006.01)

(52) U.S. Cl.
CPC ........ *G06F 11/0796* (2013.01); *G06F 11/1633* (2013.01); *G06F 21/554* (2013.01); *B61L 21/04* (2013.01)

(56) References Cited

U.S. PATENT DOCUMENTS

| | | | |
|---|---|---|---|
| 7,254,712 B2 * | 8/2007 | Godfrey et al. | 713/176 |
| 7,730,518 B2 * | 6/2010 | Jakobsson et al. | 726/1 |
| 8,020,001 B2 * | 9/2011 | Lundblade et al. | 713/176 |
| 8,150,039 B2 * | 4/2012 | de Cesare et al. | 380/277 |
| 8,156,082 B2 * | 4/2012 | Srivastava et al. | 707/674 |
| 8,510,570 B2 * | 8/2013 | Smith et al. | 713/190 |
| 8,566,929 B2 * | 10/2013 | Thakare | 726/22 |
| 8,972,746 B2 * | 3/2015 | Johnson et al. | 713/189 |
| 2004/0083384 A1 * | 4/2004 | Hypponen | 713/200 |
| 2004/0199786 A1 * | 10/2004 | Walmsley et al. | 713/200 |
| 2006/0277409 A1 * | 12/2006 | Galwas | 713/176 |
| 2008/0028235 A1 * | 1/2008 | Smith et al. | 713/190 |
| 2008/0196037 A1 * | 8/2008 | Ple | 718/107 |
| 2008/0301461 A1 * | 12/2008 | Coulier et al. | 713/184 |
| 2009/0089584 A1 * | 4/2009 | Bender et al. | 713/176 |
| 2009/0287831 A1 * | 11/2009 | Nakagawa et al. | 709/228 |
| 2010/0138571 A1 * | 6/2010 | Cain et al. | 710/56 |
| 2011/0239269 A1 * | 9/2011 | Wahl et al. | 726/1 |
| 2012/0051544 A1 * | 3/2012 | Liu et al. | 380/270 |

* cited by examiner

METHOD FOR ENHANCING DATA RELIABILITY IN A COMPUTER

Priority is hereby claimed to FR 12 55728 filed on Jun. 19, 2012, the entire disclosure of which is hereby incorporated by reference herein.

The present invention relates to a method for enhancing data reliability in a computer, the computer being able to provide an output datum from an input datum, and including at least two data processing modules, and a computing member connected to each processing module.

The present invention also relates to a computer, able to provide an output datum from an input datum.

BACKGROUND

Computers that are able to process data and/or pieces of information circulating in a communications network used in a secured communication system, for example a railway management system are known. In order to ensure critical security functions required by the railway management system, the probability of occurrence of a wrong and undetectable datum at the output of such a computer should be reduced as much as possible. The European Railway Safety standard EN 50 128 for example imposes that equipment related to the safety of trains be designed so that their probability of failure on demand is comprised between $10^{-9}$ and $10^{-7}$. A known technique for ensuring safety is called <<composite security>> and consists of having the same processing operations performed by several data processing modules of a same computer, and then of proceeding with a <<majority vote>>. For this purpose, each module computes an output datum from a same input datum. Moreover, such a computer generally includes arbitration means capable of ensuring the <<majority vote>> function among the computed output data.

The arbitration means of such a computer however include a minimal hardware layer, sometimes completed with a software layer. Now, the failure of such a hardware layer may cause a security flaw which may lead to critical incidents for the security communication system.

SUMMARY OF THE INVENTION

An object of the present invention may propose a method for enhancing the reliability of data in a computer with which it is possible to do without the use of dedicated hardware means for ensuring the majority vote function of the computer.

The present invention provides a method for enhancing the reliability of data in a computer, characterized in that it comprises the following steps:
- computing with each processing module an intermediate security code from the corresponding intermediate datum,
- transmitting to the computing member, with each processing module, the intermediate security code and the intermediate datum,
- computing with the computing member, a security code from the intermediate security codes,
- selecting, with the computing member, an intermediate datum from among the received intermediate data, the output datum of the computer comprising the selected intermediate datum, and
- transmitting to a receiving device, with the computing member, the security code and the output datum.

According to other advantageous aspects of the invention, the method may comprise one or several of the following features, taken individually or according to all the technically possible combinations:
- each processing module includes first means for storing in memory at least one encryption variable and an encryption function, the encryption function being identical for all the processing modules, and during the step for computing an intermediate security code from the corresponding intermediate datum, said computation consists of applying, with each processing module, the encryption function to at least the intermediate datum and to the encryption variable;
- the computing member includes second means for storing in memory at least one decryption constant and a consolidation function, and during the step for computing a security code from intermediate security codes, said computation consists of applying, with the computing member, the consolidation function to each received intermediate security code and to the decryption constant;
- the method further includes, between the step for computing an intermediate datum and the step for computing an intermediate security code, a step for transmitting, with each processing module, the value of its intermediate datum to the other processing modules and a step for testing, with each processing module, the existence of a majority value from among the whole of the values of the intermediate data, the majority value being the most frequent value among the values of intermediate data, if this value exists;
- if the test for the existence of a majority value is negative during the corresponding test step, the method includes a step for suppressing with one of the processing modules its encryption variable;
- the method further comprises, before the step for computing an intermediate security code, a step for resetting, with each processing module, its encryption variable, said resetting step being carried out in a synchronized way among all the processing modules;
- the output datum is the intermediate datum selected by the computing member during the selection step;
- the method further includes a step for receiving, with the receiving device, the security code and the output datum and a step for checking, with the receiving device, the consistency between the security code and the output datum.

The present invention also provides a computer, characterized in that the first computing means are further capable of computing an intermediate security code from the corresponding intermediate datum, each processing module being capable of transmitting to the computing member, the intermediate security code and the corresponding intermediate datum, and in that the computing member includes second means for computing a security code from intermediate security codes, the computing member being capable of selecting an intermediate datum among the received intermediate data and of transmitting the security code and the output datum to a receiving device, the output datum comprising the selected intermediate datum.

The present invention further provides a communication unit comprising a computer and a device for receiving data, the computer being capable of providing a security code and a datum, the receiving device including means for storing in memory a control algorithm, the receiving device being capable of receiving the security code and the output datum, and of checking, by applying the control algorithm, the consistency between the security code and the output datum, wherein the computer is as defined above.

The present invention even further provides a railway management system which comprises at least one communication unit as defined above.

BRIEF DESCRIPTION OF THE DRAWINGS

These features and advantages of the invention will become apparent upon reading the description which follows, only given as a non-limiting example, and made with reference to the appended drawings, wherein.

DETAILED DESCRIPTION

In the present description, logic data or information circulating on a communication network will be called <<security data>>. The communication network is typically a non-secured network, and each security datum circulates on the network accompanied by a security code. A security datum transmitted over the network by a transmission device is only accepted by a receiving device if the receiving device determines, by means of a predetermined control algorithm, that the transmitted the security datum and the security code which accompanies it are consistent.

Figure 1:
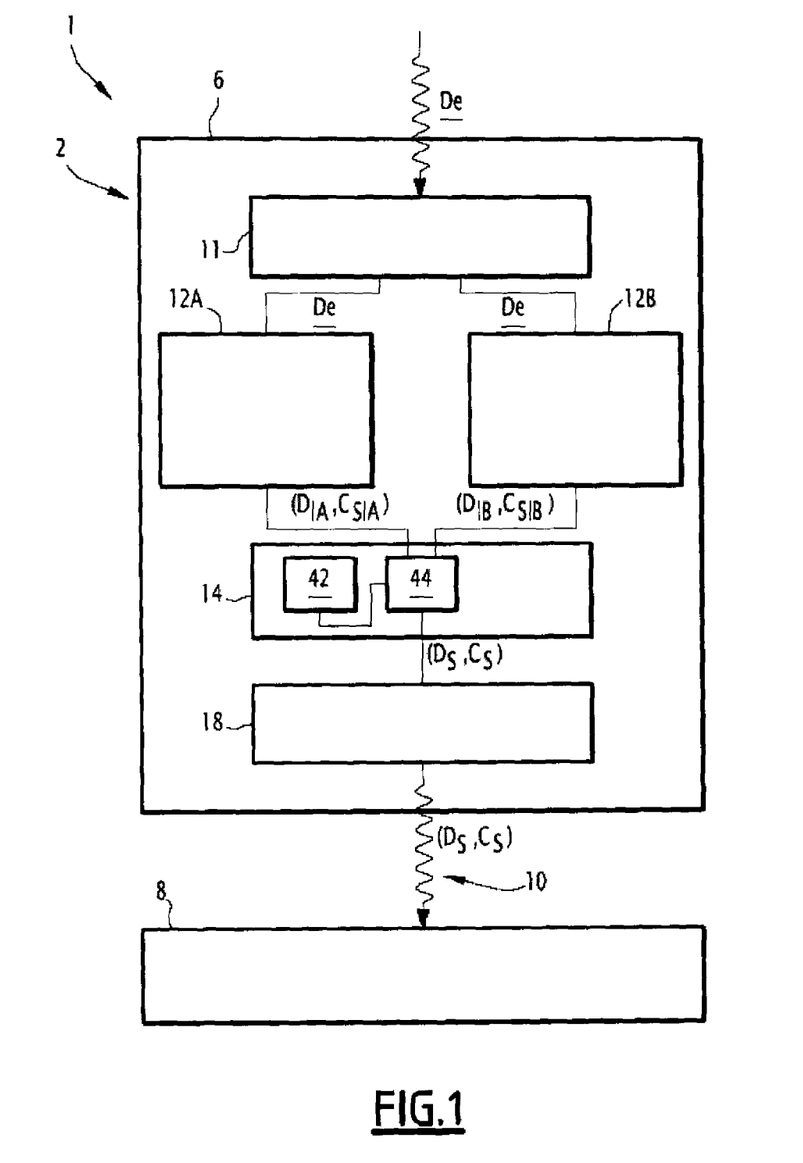
FIG. 1 is a schematic illustration of a railway management system comprising a computer according to the invention, the computer including two data processing modules.

FIG. 1 illustrates a railway management system 1 comprising a communication unit 2. The railway management system 1 is, for example, implemented in a railway station. It is for example capable of determining control commands and having them circulate towards the trains, or towards the track security systems such as switch points.

The unit 2 comprises a computer 6 and a device 8 for receiving data, connected to the computer 6 via a data link 10.

The computer 6 includes means, for example, a receiver, 11 for receiving data, a first data processing module 12A and a second data processing module 12B, each processing module 12A, 12B being connected to the receiving means 11. The computer 6 further includes a computing member 14, connected to each processing module 12A, 12B, and transmission means, for example, a transmitter 18 for transmitting data to the receiving device 8, said transmitter 18 being connected to the member 14.

The computer 6 is a security computer, permanently fixed within the railway management system 1. The computer 6 is capable of carrying out computations on security data circulating on a communication network of the railway management system 1. The computer 6 is more particularly capable of providing the receiving device 8 with an output datum Ds, from an input datum De, stemming from a communication device, such as another computer. In the exemplary embodiment described, the input De and output Ds data are variables formed with a combination of bits, for example a 16 bit combination.

The receiving device 8 includes a memory for storing a control algorithm. The receiving device 8 is for example a security computer. It is capable of receiving a security code $C_S$ and the output datum Ds and of checking, by applying the control algorithm, the consistency between the security code $C_S$ and the output datum Ds.

The data link 10 is for example a radiofrequency link according to the IEEE-802-11 standard, generally called a Wi-Fi™ link.

The receiver 11 is capable of receiving the input datum De and of delivering this input datum De to the input of each processing module 12A, 12B.

The first processing module 12A and the second processing module 12B each have a same structure. In the following, only the structure of the first processing module 12A will therefore be described.

Figure 2:
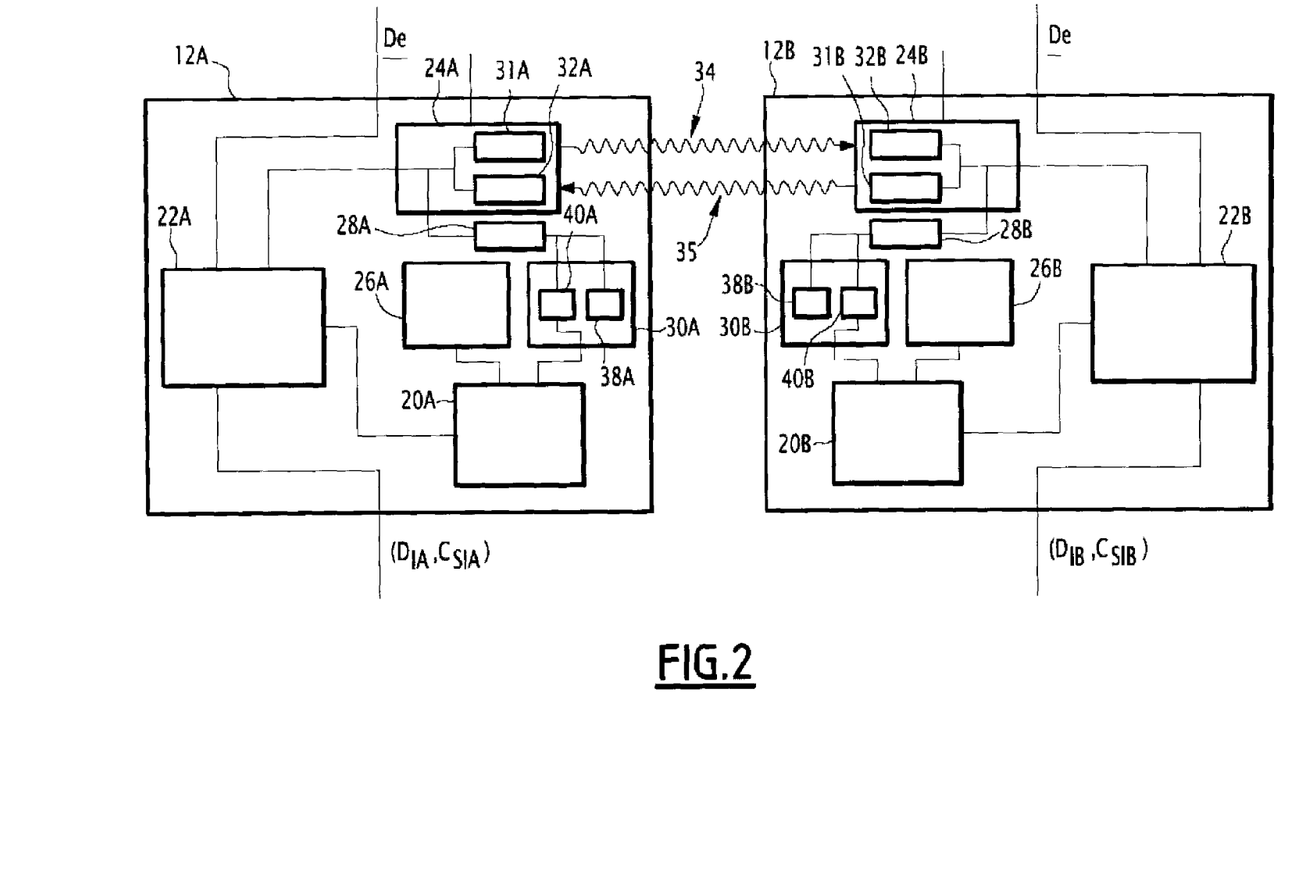
FIG. 2 is a schematic illustration of one of the data processing modules of the computer of FIG. 1.

As illustrated in FIG. 2, the first processing module 12A includes a first memory storage device or means 20A, first computing module or means 22A, connected to the memory storage means 20A, and communication module or means 24A, connected to the first computing means 22A. The first processing module 12A further includes a deletion module or means 26A, connected to the first memory storage means 20A, and synchronization module or means 28A, connected to the communication means 24A.

The first processing module 12A also includes modification module or means 30A, connected to the first memory storage means 20A and to the synchronization means 28A.

In the exemplary embodiment, the first memory storage means 20A are formed with a flash memory, known per se. Alternatively, the first memory storage means 20A are formed with a rewritable non-volatile memory. Still alternatively, the first memory storage means 20A are formed with a rewritable volatile memory.

The first memory storage means 20A are capable of storing an encryption variable $V_{CA}$, specific to the first module 12A. In the exemplary embodiment, the encryption variable $V_{CA}$ is formed with a combination of 16 bits. The first memory storage means 20A are also capable of storing a computing function σ, an encryption function Fc and a reset function $F_{reset}$. In the exemplary embodiment, the computing function σ is the known standard <<NOT>> logic function. Moreover, the encryption function Fc is in the exemplary embodiment the known standard <<exclusive OR>> logic function. The reset function $F_{reset}$ for example is also the <<exclusive OR>> logic function>>.

In the exemplary embodiment of FIG. 2, the first computing means 22A are formed with a data processor, known per se. The first computing means 22A are connected to the receiving means 11 on the one hand and to the member 14 on the other hand. The first computing means 22A receive the input datum De and provide at the input of the member 14 an intermediate output datum $D_{IA}$ and an intermediate security code $C_{SIA}$. The first computing means 22A are capable of computing the value of the intermediate output datum $D_{IA}$ from the value of the input datum De.

The datum $D_{IA}$ is then, for example, expressed as follows:

$$D_{IA} = \sigma(\underline{De}) \quad (1)$$

In the exemplary embodiment, the intermediate output $D_{IA}$ is a variable formed with a combination of 16 bits.

The first computing means 22A are further capable of computing the value of the intermediate security code $C_{SIA}$ from the value of the intermediate output datum $D_{IA}$ and from the value of the encryption variable $V_{CA}$. The intermediate security code $C_{SIA}$ is expressed as follows:

$$C_{SIA} = Fc(F_1(D_{IA}, M_A), V_{CA}) \quad (2)$$

$F_1$, respectively $M_A$, are a function, respectively a constant, stored in the first memory storage means 20A. $F_1$ is for example the <<AND>> logic function. In the exemplary embodiment, $M_A$ is a constant formed with a combination of 16 bits. $M_A$ for example is formed with a combination of eight first bits, the value of which is equal to one and of eight last bits, the value of which is equal to zero.

The first computing means 22A are further capable of testing for the existence of a majority value from among several intermediate output data values, the majority value being the most frequent value from among the intermediate output data values, if this value exists.

The communication means 24A include a transmitter or transmission means 31A and a receiver or receiving means 32A. The transmission means 31A are able to be connected to the receiving means 32B of the second module 12B via a data link 34. The receiving means 32A are able to be connected to the transmission means 31B of the second module 12B via the data link 35.

The data links 34, 35 are for example radiofrequency links according to the IEEE-802-11 standard, also called Wi-Fi™ links.

The deletion means 26A are for example formed with a data processor. They are able to delete the current value of the encryption variable $V_{CA}$ stored in the memory 20A.

The synchronization means 28A for example include a clock capable of delivering pulsed signals at regular instants i. The synchronization means 28A are capable of sending synchronization signals to the communication means 24A and to the modification means 30A. The synchronization means 28A are further capable of synchronizing with the synchronization means 28B of the second processing module 12B, via the synchronization signals transmitted by the communication means 24A.

The modification means 30A for example include a generator 38A of pseudo-random sequences and a processor 40A. The generator 38A of pseudo-random sequences is connected to the synchronization means 28A and to the processor 40A. The generator 38A is able to provide the processor 40A with a pseudo-random signal $S_{pa}$, following reception of a synchronization signal delivered by the synchronization means 28A. More specifically, at each instant i, the generator 38A is able to provide the processor 40A with a pseudo-random signal $S_{pa}(i)$.

The processor 40A is further connected to the first memory storage means 20A and to the synchronization means 28A. The processor 40A is capable, following reception of a synchronization signal delivered by the synchronization means 28A, of modifying the current value of the encryption variable $V_{CA}$ stored within the first memory storage means 20A. More specifically, at each instant i the processor 40A is able to determine the current value $V_{CA}(i)$ of the encryption variable $V_{CA}$, notably from the previous value $V_{CA}(i-1)$ of the encryption variable $V_{CA}$. The current value at instant i of the encryption variable $V_{CA}$ is expressed as follows:

$$V_{CA}(i)=F_{reset}[S_{pa}(i),V_{CA}(i-1)] \quad (3)$$

The modification means 30A are thus able to modify the current value of the encryption variable $V_{CA}$ stored within the first memory storage means 20A.

The first processing module 12A is thus able to compute and to provide the input of the member 14 with the intermediate output datum $D_{IA}$ and the intermediate security code $C_{SIA}$.

The first memory storage device or means 20B of the second processing module 12B are able to store an encryption variable $V_{CB}$, specific to the module 12B, and a computing function σ, identical with the computing function σ of the first processing module 12A. In the exemplary embodiment, the encryption variable $V_{CB}$ is formed by a combination of sixteen bits. The first memory storage means 20B are also able to store an encryption function Fc, identical with the encryption function Fc of the first processing module 12A, and a reset function $F_{reset}$, identical with the reset function $F_{reset}$ of the first processing module 12A.

The modification module or means 30B of the second processing module 12B are able to modify the current value of the encryption variable $V_{CB}$ stored within the first memory storage means 20B. The current value at instant i of the encryption variable $V_{CB}$ is expressed as follows:

$$V_{CB}(i)=F_{reset}[S_{pa}(i),V_{CB}(i-1)] \quad (4)$$

The second processing module 12B is thus able to compute and to provide the input of the computing member 14, with an intermediate output datum $D_{IB}$ and an intermediate security code $C_{SIB}$. The intermediate output datum $D_{IB}$ and the intermediate security code $C_{SIB}$ are expressed as follows:

$$D_{IB}=\sigma(\underline{De}) \quad (5)$$

$$C_{SIB}=Fc(F_1(D_{IB},M_B),V_{CB}) \quad (6)$$

$F_1$, respectively $M_B$, are a function, respectively a constant stored in the first memory storage means 20B. The function $F_1$ is identical with the function $F_1$ of the first processing module 12A. In the exemplary embodiment, $M_B$ is a constant formed by a combination of sixteen bits. $M_B$ is for example formed with a combination of eight first bits, the value of which is equal to zero, and of eight last bits, the value of which is equal to one.

In the described exemplary embodiment, the intermediate output datum $D_{IB}$ is a variable formed by a combination of sixteen bits.

At each instant i the values of the encryption variable $V_{CA}$, respectively $V_{CB}$, of the processing module 12A, respectively 12B, verify together a same mathematical relationship, for example the following mathematical relationship:

$$F_2[V_{CA}(i),V_{CB}(i)]=K \quad (7),$$

wherein $F_2$ is for example the <<exclusive OR>> logic function and K is a constant. In the exemplary embodiment, K is a constant formed by a combination of sixteen bits.

The processing modules 12A, 12B are capable of exchanging data according to a synchronized communication protocol, via their communication means and their respective synchronization means.

The computing member 14 provides at the input of the transmission means 18, the output datum Ds as well as the security code $C_S$. The member 14 includes second memory storage means 42 and second computing means 44, connected to the second memory storage means 42.

The second memory storage means 42 are formed, for example with a flash memory. The second memory storage means 42 are able to store a decryption constant $K_D$ and a consolidation function $F_{conso}$. In the exemplary embodiment, the consolidation function $F_{conso}$ is the <<exclusive OR>> logic function and the decryption constant $K_D$ is a constant formed by a combination of sixteen bits.

In the described exemplary embodiment, the second computing means 44 are formed with a data processor. The second computing means 44 are connected to each of the first computing means 22A, 22B on the one hand and to the transmission means 18 on the other hand. The second computing means 44 provide at the input of the transmission means 18, the output datum Ds and the security code $C_S$. The second computing means 44 are able to compute the value of the output datum Ds from the value of the intermediate output data $D_{IA}$, $D_{IB}$. The value of the output datum Ds is, in the exemplary embodiment, taken as equal to the value of the intermediate output datum $D_{IA}$. Alternatively, the value of the output datum Ds is taken as equal to the value of the intermediate datum $D_{IB}$.

The second computing means 44 are further able to compute the value of the security code $C_S$ from the value of each intermediate security code $C_{SIA}$, $C_{SIB}$ and from the value of the decryption constant $K_D$. The security code $C_S$ is for example expressed as follows:

$$C_S = F_{conso}(C_{SIA}, C_{SIB}, K_D) \tag{8}$$

The transmission means 18 are able to transmit the output datum Ds and the security code $C_S$ to the receiving device 8.

Figure 3:
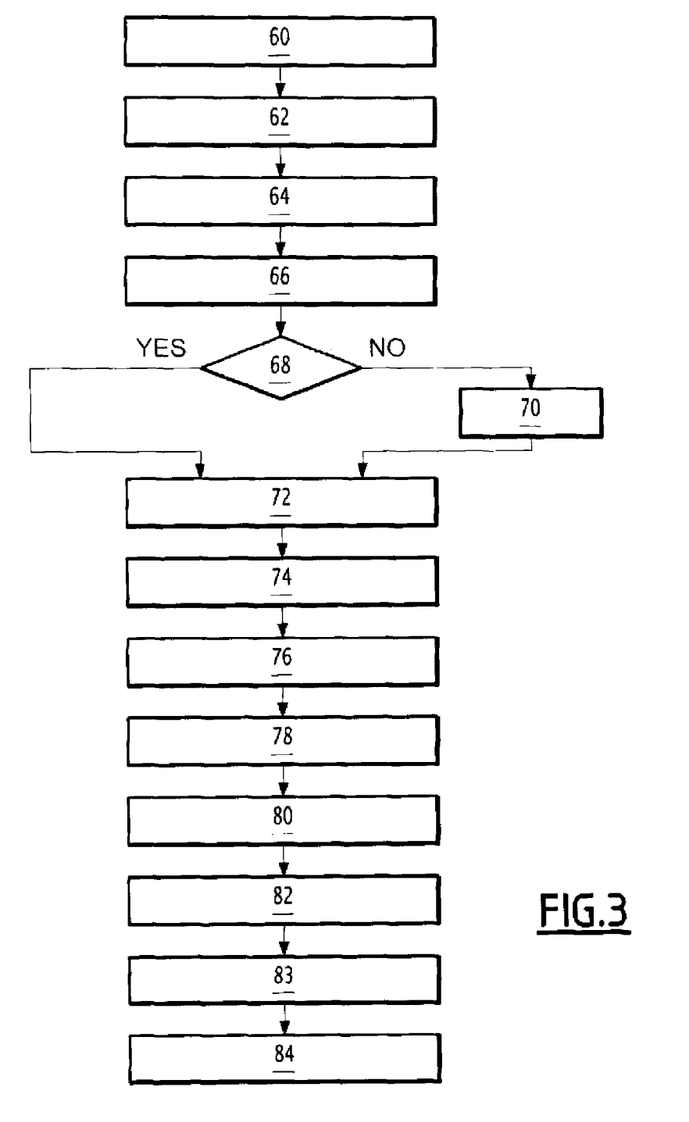
FIG. 3 is a flowchart illustrating a method for enhancing the reliability of data according to the invention, applied by the computer of FIG. 1.

In FIG. 3, are illustrated the steps of a method for enhancing the reliability of the data applied by the computer 6, in an embodiment of the invention.

In the following of the description, it is considered that the probability of occurrence of a simultaneous failure in the processing modules 12A, 12B is zero.

It is further assumed that at the present instant i−1, the first memory storage means 20A, respectively 20B, store a current value $V_{CA}(i-1)$, respectively $V_{CB}(i-1)$ of the encryption variable $V_{CA}$, respectively $V_{CB}$.

During an initial step 60, the receiving means 11 receive a message including the input datum De.

During a following step 62, the receiving means 11 provide the input datum De to each of the first computing means 22A, 22B.

During a following step 64, the first computing means 22A, respectively 22B, compute the current value of the intermediate output datum $D_{IA}$, respectively $D_{IB}$ from the current value of the input datum De. The expression of the intermediate output datum $D_{IA}$, respectively $D_{IB}$ is given by formula (1), respectively formula (5).

Additionally, during a following step 66, the first computing means 22A, respectively 22B, transmit the current value of the intermediate output datum $D_{IA}$, respectively $D_{IB}$, to the transmission means 31A, respectively 31B. The transmission means 31A, respectively 31B, then transmit the current value of the intermediate output datum $D_{IA}$, respectively $D_{IB}$ to the receiving means 32B, respectively 32A, via the data link 34, respectively 35. The receiving means 32B, respectively 32A, transmit the current value of the intermediate output datum $D_{IA}$ respectively $D_{IB}$ to the first computing means 22B, respectively 22A.

Additionally, during a following step 68, each of the first computing means 22A, 22B determines whether there exists a majority value from among the current values of the intermediate output data $D_{IA}$, $D_{IB}$.

If at the end of step 68, each of the first computing means 22A, 22B determines that there does not exist any majority value from among the current values of the intermediate output data $D_{IA}$, $D_{IB}$, the deletion means 26A delete the current value of the encryption variable $V_{CA}$ in the first memory storage means 20A during step 70. Alternatively, the deletion means 26B delete the current value of the encryption variable $V_{CB}$ in the first memory storage means 20B during step 70. Additionally, a following step 72 is then applied by the processors 40A, 40B, as described subsequently.

If at the end of step 68, each of the first computing means 22A, 22B determines that there exists a majority value from among the current values of the intermediate output data $D_{IA}$, $D_{IB}$, step 72 is carried out.

Step 72 is triggered at instant i immediately following the end of step 68 or of step 70. At instant i, the current values $V_{CA}(i-1)$, $V_{CB}(i-1)$ of the encryption variables $V_{CA}$, $V_{CB}$ become previous values. At the same instant i, the processor 40A, respectively 40B, determines the current value $V_{CA}(i)$, respectively $V_{CB}(i)$ of the encryption variable $V_{CA}$, respectively $V_{CB}$ from the previous value $V_{CA}(i-1)$, respectively $V_{CB}(i-1)$ of said encryption variable. Step 72 is thus carried out in a synchronous way among the processing modules 12A, 12B. The expression of the current value of the encryption variable $V_{CA}$, respectively $V_{CB}$ at instant i is given by formula (3) respectively formula (4).

During a following step 74, the processor 22A, respectively 22B, computes the current value of the intermediate security $C_{SIA}$, respectively $C_{SIB}$, from the current value of the intermediate output datum $D_{IA}$, respectively $D_{IB}$, and from the current value of the encryption variable $V_{CA}$, respectively $V_{CB}$. The expression of the intermediate security code $C_{SIA}$,—respectively $C_{SIB}$, is given by formula (2), respectively formula (6).

During a following step 76, the first computing means 22A, respectively 22B, transmit the intermediate output datum $D_{IA}$, respectively $D_{IB}$ and the intermediate security code $C_{SIA}$, respectively $C_{SIB}$ to the second computing means 44.

During a following step 78, the second computing means 44 compute the current value of the security code $C_S$ from the current value of each intermediate security code $C_{SIA}$, $C_{SIB}$ and from the value of the decryption constant $K_D$. The expression of the security code $C_S$ is given by formula (8).

During a following step 80, the second computing means 44 select a value from among the values of the intermediate output datum $D_{IA}$, $D_{IB}$, the selected value is for example the current value of the intermediate output datum $D_{IA}$. The current value of the output datum Ds is taken equal to the selected value, in other words equal to the current value of the intermediate output datum $D_{IA}$.

During a following step 82, the second computing means 44 transmit the output datum Ds and the security code $C_S$ to the transmission means 18. The transmission means 18 then transmit the output datum Ds and the security code $C_S$ to the receiving device 8.

During a following step 83, the receiving device 8 receives the output datum Ds and the security code $C_S$.

During a following step 84, the receiving device 8 checks, by applying the control algorithm, for the consistency between the output datum Ds and the security code $C_S$.

According to a first aspect of the invention, the method for enhancing the reliability of data according to the invention thus gives the possibility of ensuring the <<majority vote>> function of the computer. Indeed, if the values of the intermediate output datum $D_{IA}$, $D_{IB}$ are identical, the output datum Ds assumes as a value, the majority value, in this case the single possible value. Moreover, if the values of the intermediate output data $D_{IA}$, $D_{IB}$ differ, the security code $C_S$ assumes a particular value, different from the value which it assumes when the values of the intermediate output data $D_{IA}$, $D_{IB}$ are identical.

Thus, if the values of the intermediate output data $D_{IA}$, $D_{IB}$ differ, the receiving device 8 determines inconsistency between the transmitted output datum Ds and the security code $C_S$. The receiving device 8 then rejects the output datum Ds. The computer 6 applying the method according to the invention therefore gives the possibility of providing in every case either a correct output datum Ds, or an erroneous but detectable output datum Ds.

According to a second aspect of the invention, independent of and additional to the first aspect, the method for enhancing the reliability of data gives the possibility of ensuring the <<passivation>> function of the computer 6. More particularly, the steps, 66, 68 and 70 correspond to the application of this <<passivation>> function.

With the reset step 72, it is moreover advantageously possible for the computer 6 to periodically self-test the <<passivation>> function, and thus protect itself against the risk of failure of the deletion means 26A, 16B. This risk corresponds to an impossibility for the deletion means of deleting the encryption variable $V_{CA}$, respectively $V_{CB}$, in the first memory storage means 20A, respectively 20B. Further, in the case of a failure occurring in one of the processing modules during the reset step 72, the mathematical relationship of formula (7), theoretically verified at each instant i by the encryption variables $V_{CA}$, $V_{CB}$ together, is no longer verified. By this feature, the <<passivation>> function of the computer 6 continues to be permanently ensured, even in the case of a failure in one of the processing modules during step 72.

It is thus realized that the method for enhancing the reliability of data according to this embodiment of the invention gives the possibility of doing without the use of dedicated hardware means for ensuring the majority vote function of the computer.

This embodiment is the preferential embodiment of the invention.

One skilled in the art will understand that the invention applies in the same way to a method for enhancing the reliability of data, not including the steps 66, 68, 70 and 72.

In an alternative, the computer includes a number N1 of data processing modules 12, N1 being an integer greater than or equal to three. Each processing module 12 includes first memory storage means 20 and first computing means 22. The first memory storage means 20 of a processing module 12 are able to store any encryption variable $V_C$, specific to the module. Each of the first computing means 22 receives the input datum De and provides at the input of the member 14 an intermediate datum $D_I$ and an intermediate security code $C_{SI}$. Similarly to the preferential embodiment of the invention, the processing modules 12 are able to exchange data according to a synchronized communication protocol, via their communication means and their respective synchronization means. Further, the computing functions σ, the encryption functions Fc and the reset functions $F_{reset}$ of each of the processing modules are identical.

According to this alternative embodiment, each of the first computing means 22 is further capable of checking the match between the value of the corresponding intermediate output datum $D_I$ and a possible majority value. Further, the method includes two additional steps 86, 88. Steps 86, 88 are carried out between steps 68 and step 72 if, at the end of step 68, each of the first computing means 22 determines that there exists a majority value from among the values of the intermediate output data $D_I$.

During step 86, each of the first computing means 22 checks whether the value of its intermediate output datum $D_I$ is equal to the majority value.

If at the end of step 86, each of the first computing means 22 checks that the value of its intermediate output datum $D_I$ is equal to the majority value, step 72 is carried out.

If, at the end of step 86, at least one of the first computing means 22 checks that the value of its datum from its intermediate output $D_I$ is not equal to the majority value, the deletion means of the corresponding processing module delete the current value of the encryption variable $V_C$ in the first memory storage means 20 during step 88.

One skilled in the art will understand that during step 76, the first computing means 22 of each processing module 12 transmit the corresponding intermediate output datum $D_I$ and the corresponding intermediate security code $C_{SI}$ to the second computing means 44 of the computing member 14.

During the following step 78, the second computing means 44 compute the current value of the security code $C_S$ from the current value of each intermediate security code $C_{SI}$ transmitted during step 76.

During the following step 80, the second computing means 44 select a value from among the values of the intermediate output data $D_I$ transmitted during step 76. The current value of the output datum Ds is then taken to be equal to the selected value.

During the following step 82, the second computing means 44 transmit the output datum Ds and the security code $C_S$ to the transmission means 18. The transmission means 18 then transmit the output datum Ds and the security code $C_S$ to the receiving device 8.

During the following step 83, the receiving device 8 receives the output datum Ds and the security code $C_S$.

During the following step 84, the receiving device 8 checks, by applying the control algorithm, the consistency between the output datum Ds and the security code $C_S$.

According to another particular alternative embodiment, not shown, the computer includes three data processing modules 12A, 12B, 12C. The <<majority vote>> condition is then met when at least two of the three modules have produced consistent output data from the same input datum.

A thereby formed computer then includes three pairs (12A; 12B), (12B; 12C) and (12C; 12A) of processing modules, each module 12A, 12B, 12C belonging to two pairs.

In each processing module 12A, 12B, 12C, the process for generating the intermediate security codes is then doubled. In particular, two intermediate security codes $C_{SI-AB}$, $C_{SI-AC}$, $C_{SI-BA}$, $C_{SI-BC}$, $C_{SI-CA}$, $C_{SI-CB}$ are generated for each module 12A, 12B, 12C. More specifically, each module 12A, 12B, 12C generates a code for each pair (12A; 12B), (12B; 12C), (12C; 12A) to which it belongs.

The first memory storage means 20 of each module 12A, 12B, 12C are able to store two encryption variables Vc1 and Vc2, relating to the module.

Each of the first computing means 22 receives the input datum De and provides at the input of the member 14, an intermediate datum $D_I$ and two intermediate security codes $C_{SI}$: the module 12A computes two codes $C_{SI-AB}$ and $C_{SI-AC}$; the module 12B computes two codes $C_{SI-BA}$ and $C_{SI-BC}$; the module 12C computes two codes $C_{SI-CA}$ and $C_{SI-CB}$.

The member 14 selects a pair of modules from the three possible pairs (12A; 12B), (12B; 12C), (12C; 12A), on the basis of a majority vote of the received data $D_I$.

The member 14 then computes the security code $C_S$ from the intermediate security code associated with the selected pair. Thus, if the pair (12A; 12B) has been selected, then the security code $C_S$ is computed from the intermediate codes $C_{SI-AB}$ and $C_{SI-BA}$.

It is thus realized that the method for enhancing the reliability of data according to the invention gives the possibility of doing without the use of dedicated hardware means for ensuring the majority vote and passivation function of the computer.

What is claimed is:

1. A method for enhancing the reliability of data in a computer, the computer being capable of providing an output datum (Ds) from an input datum (De), and including at least two data processing hardware modules, and a computing hardware module connected to each processing hardware module, the method comprising the steps of:
   computing, with each processing hardware module, an intermediate datum ($D_{IA}$, $D_{IB}$) from the input datum (De), the computation including an application of a computing function (σ) to the input datum (De), the computing function (σ) being identical for all the processing hardware modules;

computing, with each processing hardware module, an intermediate security code ($C_{SIA}$, $C_{SIB}$) from the corresponding intermediate datum ($D_{IA}$, $D_{IB}$), transmitting to the computing hardware module, with each processing hardware module, the intermediate security code ($C_{SIA}$, $C_{SIB}$) and the intermediate datum ($D_{IA}$, $D_{IB}$), computing, with the computing hardware module, a security code ($C_S$) from the intermediate security codes ($C_{SIA}$, $C_{SIB}$), selecting, with the computing hardware module, an intermediate datum from the received intermediate data ($D_{IA}$, $D_{IB}$), the output datum (Ds) of the computer including the selected intermediate datum, and transmitting to a receiving device, with the computing hardware module, the security code ($C_S$) and the output datum (Ds), the receiving device being capable of checking a consistency between the security code (Cs) and the output datum (Ds), that is giving the possibility for ensuring the majority vote and passivation function of the computer.

2. The method according to claim 1, wherein each processing hardware module includes a first storage module for storing in memory at least one encryption variable ($V_{CA}$, $V_{CB}$) and an encryption function (Fc), the encryption function (Fc) being identical for all of the processing hardware modules, and in that during the step of computing an intermediate security code ($C_{SIA}$, $C_{SIB}$) from the corresponding intermediate datum ($D_{IA}$, $D_{IB}$), the computation includes applying, with each processing hardware module, the encryption function (Fc) to at least the intermediate datum ($D_{IA}$, $D_{IB}$) and to the encryption variable ($V_{CA}$, $V_{CB}$).

3. The method according to claim 1, wherein the computing hardware module includes a second storage module for storing in memory at least one decryption constant ($K_D$) and a consolidation function ($F_{conso}$), and that during the step of computing a security code ($C_S$) from intermediate security codes ($C_{SIA}$, $C_{SIB}$), the computation includes applying, with the computing hardware module, the consolidation function ($F_{conso}$) to each received intermediate security code ($C_{SIA}$, $C_{SIB}$) and to the decryption constant ($K_D$).

4. The method according to claim 2, further comprising the step of:

between the step of computing an intermediate datum and the step of computing an intermediate security code, a step of transmitting, with each processing hardware module, the value of the intermediate datum ($D_{IA}$, $D_{IB}$) to the other processing hardware modules and a step of testing, with each processing hardware module, the existence of a majority value from the whole of the values of the intermediate data ($D_{IA}$, $D_{IB}$), a majority value being the most frequent value among the values of intermediate data ($D_{IA}$, $D_{IB}$), if this value exists.

5. The method according to claim 4, wherein, if the test of existence of the majority value is negative during the corresponding testing step, the method includes a step for suppressing with one of the processing hardware modules, the encryption variable ($V_{CA}$, $V_{CB}$).

6. The method according claim 2, further comprising the step of:

before the step of computing an intermediate security code, a step of resetting, with each processing hardware module, the encryption variable, the reset step being carried out in a synchronized way among all the processing hardware modules.

7. The method according claim 1, wherein the output datum (Ds) is the intermediate datum selected by the computing hardware module during the selection step.

8. The method according to claim 1, further comprising the steps of:

receiving, with the receiving device, the security code ($C_S$) and the output datum (Ds); and checking, with the receiving device, the consistency between the security code ($C_S$) and the output datum (Ds).

9. The method according to claim 1, wherein the computer includes three data processing hardware modules, the three processing hardware modules being distributed in three pairs of modules, each module belonging to two distinct pairs, in that each processing hardware module computes two intermediate security codes from the corresponding intermediate datum, each intermediate security code being associated with one of the two pairs to which belongs the module, in that each processing hardware module transmits to the computing hardware module the intermediate datum and the two associated intermediate security codes, in that the computing hardware module computes the security code (Cs) from a first intermediate security code transmitted with one of the processing hardware modules and associated with a first pair of modules, and from a second intermediate security code transmitted by another module, the second intermediate security code being associated with the first pair of modules, and in that the intermediate datum selected by the computing hardware module is one of the intermediate data associated with the modules of the first pair of modules.

10. A computer capable of providing an output datum (Ds) from an input datum (De), comprising:

at least two data processing hardware modules, each processing hardware module including a first computing module for computing an intermediate datum ($D_{IA}$, $D_{IB}$) from the input datum (De), the first computing modules being configured to apply a computing function (π) to the input datum (De), the computing function (π) being identical for all the processing hardware modules; and a computing hardware module connected to each of the at least two data processing hardware modules;

the first computing modules configured to compute intermediate security codes ($C_{SIA}$, $C_{SIB}$) from the corresponding intermediate datum ($D_{IA}$, $D_{IB}$), each data processing hardware module configured to transmit to the computing hardware module the intermediate security code ($C_{SIA}$, $C_{SIB}$) and the corresponding intermediate datum ($D_{IA}$, $D_{IB}$), the computing hardware module including a second module for computing a security code (Cs) from the intermediate security codes ($C_{SIA}$, $C_{SIB}$), the computing hardware module configured to select an intermediate datum among the received intermediate data ($D_{IA}$, $D_{IB}$) and configured to transmit the security code ($C_S$) and the output datum (Ds) to a receiving device, the output datum (Ds) including the selected intermediate datum, the receiving device being capable of checking a consistency between the security code (Cs) and the output datum (Ds), that is giving the possibility for ensuring the majority vote and passivation function of the computer.

11. A communication unit comprising:

the computer according to claim 10; and a data receiving device;

the computer configured to provide the security code ($C_S$) and the datum (Ds), the receiving device including a storage module for storing in memory a control algorithm, the receiving device configured to receive the security code ($C_S$) and the output datum (Ds), and configured to check, by applying the control algorithm, a consistency between the security code ($C_S$) and the output datum (Ds).

12. A railway management system comprising:
at least one communication unit comprising:
the computer according to claim 10; and
a data receiving device;
the computer configured to provide the security code ($C_S$) and the datum (Ds), the receiving device including a storage module for storing in memory a control algorithm, the receiving device configured to receive the security code ($C_S$) and the output datum (Ds), and configured to check, by applying the control algorithm, a consistency between the security code ($C_S$) and the output datum (Ds).

13. Non-transitory computer-readable media, having stored thereon, computer executable instructions for performing a method comprising the steps of computing, with each processing hardware module, an intermediate datum ($D_{IA}$, $D_{IB}$) from the input datum (De), the computation including an application of a computing function ($\sigma$) to the input datum (De), the computing function ($\sigma$) being identical for all the processing hardware modules;

computing, with each of at least two processing hardware modules, an intermediate security code ($C_{SIA}$, $C_{SIB}$) from the corresponding intermediate datum ($D_{IA}$, $D_{IB}$), transmitting to a computing hardware module, with each processing hardware module, the intermediate security code ($C_{SIA}$, $C_{SIB}$) and the intermediate datum ($D_{IA}$, $D_{IB}$), computing, with the computing hardware module, a security code ($C_S$) from the intermediate security codes ($C_{SIA}$, $C_{SIB}$), selecting, with the computing hardware module, an intermediate datum from the received intermediate data ($D_{IA}$, $D_{IB}$), the output datum (Ds) of the computer including the selected intermediate datum, and transmitting to a receiving device, with the computing hardware module, the security code ($C_S$) and the output datum (Ds), the receiving device being capable of checking a consistency between the security code (Cs) and the output datum (Ds), that is giving the possibility for ensuring the majority vote and passivation function of the computer.

* * * * *